United States Patent
Muroya et al.

(10) Patent No.: US 11,636,964 B2
(45) Date of Patent: *Apr. 25, 2023

(54) FERRITE SINTERED MAGNET AND ROTATING ELECTRIC MACHINE

(71) Applicant: TDK CORPORATION, Tokyo (JP)

(72) Inventors: Shogo Muroya, Tokyo (JP); Yoshitaka Murakawa, Tokyo (JP); Hiroyuki Morita, Tokyo (JP); Masanori Ikeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 17/198,517

(22) Filed: Mar. 11, 2021

(65) Prior Publication Data

US 2021/0304934 A1  Sep. 30, 2021

(30) Foreign Application Priority Data

Mar. 30, 2020 (JP) .............................. JP2020-060500

(51) Int. Cl.
| | |
|---|---|
| *H01F 1/34* | (2006.01) |
| *H02K 1/02* | (2006.01) |
| *C01G 51/00* | (2006.01) |
| *H01F 1/10* | (2006.01) |
| *C04B 35/26* | (2006.01) |

(52) U.S. Cl.
CPC ............. *H01F 1/344* (2013.01); *C01G 51/70* (2013.01); *C04B 35/2633* (2013.01); *H01F 1/10* (2013.01); *H02K 1/02* (2013.01); *C01P 2002/52* (2013.01); *C01P 2002/76* (2013.01); *C01P 2006/42* (2013.01); *C04B 2235/3208* (2013.01); *C04B 2235/3215* (2013.01); *C04B 2235/3217* (2013.01); *C04B 2235/3241* (2013.01); *C04B 2235/3418* (2013.01); *C04B 2235/767* (2013.01)

(58) Field of Classification Search
CPC ............... H01F 1/10; C04B 35/2633; C04B 2235/3208; C04B 2235/3241; C04B 2235/3217; C04B 2235/3418; C04B 2235/767

See application file for complete search history.

(56) References Cited

U.S. PATENT DOCUMENTS

| | | | | |
|---|---|---|---|---|
| 6,139,766 | A * | 10/2000 | Taguchi | .................. C04B 35/63 310/46 |
| 2006/0091352 | A1 | 5/2006 | Nagaoka et al. | |
| 2010/0155651 | A1* | 6/2010 | Mikenda | ............. C04B 35/6262 264/460 |
| 2015/0221424 | A1 | 8/2015 | Kobayashi et al. | |

FOREIGN PATENT DOCUMENTS

| | | |
|---|---|---|
| CN | 104230323 A | 12/2014 |
| CN | 104692785 A | 6/2015 |
| JP | 3337990 * | 10/2002 |
| JP | 3337990 B2 | 10/2002 |
| JP | 4301539 * | 7/2009 |
| WO | 98/38654 A1 | 9/1998 |

OTHER PUBLICATIONS

Translation for JP 3337990, Oct. 28, 2002.*
Feb. 14, 2022 Office Action issued in Indian Patent Application No. 202144011027.

* cited by examiner

*Primary Examiner* — C Melissa Koslow
(74) *Attorney, Agent, or Firm* — Oliff PLC

(57) ABSTRACT

To provide a ferrite sintered magnet having a high residual magnetic flux density (Br) and a high coercive force (HcJ), and also able to produce at a low cost. The ferrite sintered magnet includes a hexagonal M-type ferrite including A, R, Fe, and Co in an atomic ratio of $A_{1-x}R_x(Fe_{12-y}Co_y)_zO_{19}$. A is at least one selected from Sr, Ba, and Pb. R is La only or La and at least one selected from rare earth elements. $0.13 \leq x \leq 0.23$, $10.80 \leq (12-y)z \leq 12.10$, and $0.13 \leq yz \leq 0.20$ are satisfied.

7 Claims, No Drawings

FERRITE SINTERED MAGNET AND ROTATING ELECTRIC MACHINE

TECHNICAL FIELD

The present disclosure relates to a ferrite sintered magnet and a rotating electric machine.

BACKGROUND

In order to obtain a ferrite sintered magnet having excellent magnetic properties (a high residual magnetic flux density Br and a high coercive force HcJ), it is known to use a Sr ferrite which at least includes Sr and has a hexagonal M-type ferrite.

Regarding the above Sr ferrite, Patent Document 1 discloses a Sr ferrite at least including La as a rare earth element and substituting part of Fe with Co. By using the Sr ferrite including La and Co as essential elements, a ferrite sintered magnet having high Br and HcJ can be obtained.

[Patent Document 1] JP Patent No. 3337990

SUMMARY

An object of an aspect of the present invention is to provide a ferrite sintered magnet that achieves high Br and HcJ in a composition with a small amount of Co.

In response to the above object, a ferrite sintered magnet according to an aspect of the present invention has a hexagonal M-type ferrite including A, R, Fe, and Co in an atomic ratio of $A_{1-x}R_x(Fe_{12-y}Co_y)_zO_{19}$, wherein A is at least one selected from Sr, Ba, and Pb, R is La only or La and at least one selected from rare earth elements, and $0.13 \leq x \leq 0.23$, $10.80 \leq (12-y)z \leq 12.10$, and $0.13 \leq yz \leq 0.20$ are satisfied.

In the ferrite sintered magnet, $0.30 \leq Mc \leq 0.85$ may be satisfied in which Mc is CaO content (mass %) converted from a content of Ca included in the ferrite sintered magnet.

In the ferrite sintered magnet, $0.35 \leq Ms \leq 0.60$ may be satisfied in which Ms is $SiO_2$ content (mass %) converted from a content of Si included in the ferrite sintered magnet.

In the ferrite sintered magnet, $0 \leq Mb \leq 0.15$ may be satisfied in which Mb is BaO content (mass %) converted from a content of Ba included in the ferrite sintered magnet.

In the ferrite sintered magnet, $0 \leq Ma \leq 0.90$ may be satisfied in which Ma is $Al_2O_3$ content (mass %) converted from a content of Al included in the ferrite sintered magnet.

In the ferrite sintered magnet, $0 \leq Mr \leq 0.10$ may be satisfied in which Mr is $Cr_2O_3$ content (mass %) converted from a content of Cr included in the ferrite sintered magnet.

A rotating electric machine according to another aspect of the present invention includes the above ferrite sintered magnet.

DETAILED DESCRIPTION

Hereinafter, a ferrite sintered magnet according to an embodiment of the present invention will be described below.

The ferrite sintered magnet has a hexagonal M-type ferrite including A, R, Fe, and Co in an atomic ratio of $A_{1-x}R_x(Fe_{12-y}Co_y)_zO_{19}$. In the present specification, the ferrite sintered magnet according to the present embodiment may be referred as the ferrite sintered magnet. A is at least one element selected from strontium (Sr), barium (Ba), and lead (Pb). R is La only or La and at least one selected from rare earth elements. Also, x, (12−y)z, and yz satisfy below formulas.

$0.13 \leq x \leq 0.23$, $10.80 \leq (12-y)z \leq 12.10$ $0.13 \leq yz \leq 0.20$ The ferrite sintered magnet has a hexagonal M-type (hexagonal magnetoplumbite-type) ferrite which can be represented by an atomic ratio of $A_{1-x}R_x(Fe_{12-y}Co_y)_zO_{19}$.

Specifically, the ferrite sintered magnet contains ferrite grains which can be represented by an atomic ratio of $A_{1-x}R_x(Fe_{12-y}Co_y)_zO_{19}$. The ferrite grain is a crystal grain and has a hexagonal magnetoplumbite-type crystal structure. The hexagonal magnetoplumbite-type crystal structure of the ferrite grain can be verified by X-ray structure diffraction.

The ferrite sintered magnet has a low cobalt (Co) content (yz). Since the ferrite sintered magnet has a little amount of excess Co, a formation of different phases is suppressed and an uniform fine structure is formed. Thereby, the ferrite sintered magnet attains high Br and HcJ. Further, the ferrite sintered magnet has a low Co content (yz), thus it can be produced in a low cost.

A is at least one selected from Sr, Ba, and Pb. Sr content ratio in A may be 90 at % or more, and A may be Sr only. Ba content ratio in A may be 1 at % or less.

R is La only or La and at least one selected from rare earth elements. La content in R may be 90 at % or more and R may be La only.

The ferrite sintered magnet may satisfy below formulas.

$0.14 \leq x \leq 0.23$ $11.60 \leq (12-y)z \leq 12.10$ $0.13 \leq yz \leq 0.19$ As x, (12−y)z, and yz satisfy these formulas, Br and HcJ tend to improve easily even more. Note that, "(12−y)z" is the product of (12−y) and z. Similarly, "yz" is the product of y and z.

When x is too small, Br decreases. When x is too large, HcJ decreases. When $0.14 \leq x \leq 0.23$ is satisfied, a production stability tends to improve easily. The production stability refers to a property in which the magnetic properties (particularly HcJ) exhibit small changes even when a firing temperature changes.

When (12−y)z is too small, HcJ decreases. When (12−y)z is too large, Br and/or HcJ decrease. When $11.60 \leq (12-y)z \leq 12.10$ is satisfied, the production stability tends to improve easily. Note that, "(12−y)z" is the product of (12−y) and z.

When yz is too small, HcJ decreases. When yz is too large, Br decreases and also a cost increases. When yz satisfies $0.13 \leq yz \leq 0.19$, the production stability tends to improve easily. Note that, "yz" is the product of y and z.

The ferrite sintered magnet may include calcium (Ca). In the ferrite sintered magnet, CaO content Mc (mass %) may be within a range of $0.30 \leq Mc \leq 0.85$ and may be within a range of $0.33 \leq Mc \leq 0.78$ in which Mc is CaO content (mass %) converted from a content of Ca included in the ferrite sintered magnet.

As CaO content decreases, Br tends to decrease. As CaO content increases, HcJ tends to decrease. Also, when CaO content is within the range of $0.33 \leq Mc \leq 0.78$, the production stability tends to improve easily.

The ferrite sintered magnet may include silicon (Si). In the ferrite sintered magnet, $SiO_2$ content Ms (mass %) may be within a range of $0.35 \leq Ms \leq 0.60$ and may be within a range of $0.45 \leq Ms \leq 0.60$ in which Ms is $SiO_2$ content (mass %) converted from the content of Si included in the ferrite sintered magnet.

As $SiO_2$ content decreases, HcJ tends to decrease. As $SiO_2$ content increases, Br tends to decrease. Also, when $SiO_2$ content is within the range of $0.45 \leq Ms \leq 0.60$, the production stability tends to improve easily.

The ferrite sintered magnet may include Ba. In the ferrite sintered magnet, BaO content Mb (mass %) may be within a range of $0 \leq Mb \leq 0.15$, a range of $0.03 \leq Mb \leq 0.15$, and a range of $0.08 \leq Mb \leq 0.15$ in which Mb is BaO content (mass %) converted from a content of Ba included in the ferrite sintered magnet.

When BaO content is too much, Br tends to decrease easily. Also, when BaO content is within the range of $0.08 \leq Mb \leq 0.15$, the production stability tends to improve easily.

Note that, Ba may be included in the ferrite sintered magnet as A of $A_{1-x}R_x(Fe_{12-y}Co_y)_zO_{19}$. Also, Ba may be included in the ferrite sintered magnet as simple Ba or Ba compound other than $A_{1-x}R_x(Fe_{12-y}Co_y)_zO_{19}$.

The ferrite sintered magnet may include aluminum (Al). In the ferrite sintered magnet, $Al_2O_3$ content Ma (mass %) may be within a range of $0 \leq Ma \leq 0.90$ and may be within a range of $0.05 \leq Ma \leq 0.90$ in which Ma is $Al_2O_3$ content (mass %) converted from a content of Al included in the ferrite sintered magnet.

When $Al_2O_3$ content is too much, Br tends to decrease easily.

The ferrite sintered magnet may include chromium (Cr). In the ferrite sintered magnet, $Cr_2O_3$ content Mr (mass %) may be within a range of $0 \leq Mr \leq 0.10$ and may be within a range of $0.05 \leq Mr \leq 0.10$ in which Mr is $Cr_2O_3$ content (mass %) converted from a content of Cr included in the ferrite sintered magnet.

When $Cr_2O_3$ content is too much, Br tends to decrease easily.

The ferrite sintered magnet may include manganese (Mn), magnesium (Mg), copper (Cu), nickel (Ni), and/or zinc (Zn) as impurities. A content of these impurities is not particularly limited, and 0.5 mass % or less of each of these impurities may be included in 100 mass % of the ferrite sintered magnet as a whole. Also, a total of 0.7 mass % or less of these impurities may be included.

The ferrite sintered magnet may further include elements other than mentioned in above. Specifically, the ferrite sintered magnet may include elements other than A, R, Fe, Co, oxygen (O), Ca, Si, Al, Cr, Mn, Mg, Cu, Ni, and Zn as inevitable impurities. The ferrite sintered magnet may include a total of 3 mass % or less of the inevitable impurities in 100 mass % of the ferrite sintered magnet as a whole.

Hereinbelow, a method of calculating Mc is described. Note that, same applies to a method of calculating Ms, Mb, Ma, and Mr.

First, Ca content included in the ferrite sintered magnet is measured by a usual method according to the present technical field. Then, Ca content is converted into a content of oxides (CaO). Elements other than 0 included in the ferrite sintered magnet are measured. Specifically, each content of A, R, Fe, Co, Ca, Si, Ba, Al, Cr, Mn, Mg, Cu, Ni, and Zn are measured in a similar manner and then converted into a content of oxides. Specifically, these are respectfully converted into a content of AO, $R_2O_3$, $Fe_2O_3$, $Co_3O_4$, CaO, $SiO_2$, BaO, $Al_2O_3$, $Cr_2O_3$, MnO, MgO, CuO, NiO, and ZnO. Further, regarding inevitable impurities, a content of the inevitable impurities is measured in a similar manner, then converted into oxides accordingly.

Then, CaO content is divided by a total content of all of the above oxides, thereby Mc can be calculated.

A density of the ferrite sintered magnet is not particularly limited. For example, the density measured by Archimedes method may be 4.9 $g/cm^3$ or more and 5.2 $g/cm^3$ or less. When the density is within the above range and especially when the density is 5.0 $g/cm^3$ or more, Br tends to be good easily.

Hereinafter, a method for producing the ferrite sintered magnet is described.

The following embodiment is an example of the method for producing the ferrite sintered magnet. According to the present embodiment, the ferrite sintered magnet may be produced by going through a blending step, a calcination step, a pulverization step, a compacting step, and a firing step. Each step will be described below.

<Blending Step>

In the blending step, raw materials of the ferrite sintered magnet are blended to obtain a raw material mixture. As the raw materials of the ferrite sintered magnet, a compound (raw material compound) containing one or more of the elements constituting the raw materials of the ferrite sintered magnet may be mentioned. As the raw material compound, for instance, a powder form raw material compound may be suitable As the raw material compound, oxides of each element, or compounds (carbonates, hydroxides, nitrates, and the like) which become oxides by firing may be mentioned. For example, $SrCO_3$, $BaCO_3$, $PbCO_3$, $La_2O_3$, $Fe_2O_3$, $CO_3O_4$, $CaCO_3$, $SiO_2$, MgO, $Al_2O_3$, $Cr_2O_3$, MnO, MgO, NiO, CuO, ZnO, and the like may be mentioned. The average grain size of the raw material compound powder may be 0.1 μm to 2.0 μm or so.

For example, in order to perform blending, each of the raw materials is weighed so that a desired ferrite magnetic material composition is obtained. Then, the weighed raw materials may be mixed and pulverized for 0.1 to 20 hours or so using a wet attritor, a ball mill, and the like. During this blending step, it is not necessary to mix all of the raw materials, and a part of the raw materials may be added after the calcination step described below.

<Calcination Step>

In the calcination step, the raw material mixture obtained in the blending step is calcined. Calcination may be performed, for example, in oxidizing atmosphere such as in the air and the like. A calcination temperature may be within the temperature range of 1100° C. to 1300° C. A calcination time can be 1 second to 10 hours.

A primary grain size of a calcined body obtained by calcining may be 10 μm or less.

<Pulverization Step>

The calcined body which is formed into a granular form or an aggregate form in the calcination step is pulverized into a powder form in the pulverization step. Thereby, it becomes easy to perform compacting in the later described pressing step. In the pulverization step, as mentioned in above, the raw materials which are not blended in the blending step may be added (post-addition of the raw materials). The pulverization step may be performed, for example, in a two-step process in which the calcined body is pulverized into a coarse powder (a coarse pulverization) and then further finely pulverizing the coarse powder (a fine pulverization).

The coarse pulverization is carried out, for example, until the average grain size becomes 0.5 µm to 10.0 µm by using a vibration mill and the like. In the fine pulverization, the coarsely pulverized material obtained by the coarse pulverization is further pulverized by a wet attritor, a ball mill, a jet mill, and the like.

The fine pulverization is carried out until the average grain size of the obtained finely pulverized material may be 0.08 µm to 1.00 µm or so. A specific surface area of the finely pulverized material (for example, determined by a BET method) can be 4 $m^2$/g to 12 $m^2$/g or so. A pulverizing time varies depending on a pulverization method. For example, it may be 30 minutes to 20 hours or so in case of using a wet attritor, and it may be 1 to 50 hours or so in case of wet pulverizing with a ball mill.

During the fine pulverization method, in case of a wet method, an aqueous solvent such as water and the like or a non-aqueous solvent such as toluene, xylene, and the like may be used as a dispersion medium. A high orientation tends to be obtained in below described wet pressing when the non-aqueous solvent is used. On the other hand, it is advantageous in terms of productivity when the aqueous solvent such as water and the like is used.

In the fine pulverization step, in order to increase a degree of orientation of a sintered body obtained after firing, for example, a known polyhydric alcohol or a dispersant may be added.

<Compacting Step and Firing Step>

In the compacting step and the firing step, the pulverized material (may be the finely pulverized material) obtained after the pulverization step is compacted to obtain a green compact. Then, this green compact is fired, thereby a sintered body is obtained. Compacting can be performed by any of dry pressing, wet pressing, and Ceramic Injection Molding (CIM).

In a dry pressing method, for example, a magnetic field is applied while pressure compacting the dried magnetic powder to form a green compact, and then the green compact is fired. Generally, a dry pressing method has an advantage since a time required for the compacting step is short because the dried magnetic powder is pressure compacted in the press mold.

In a wet pressing method, for example, a slurry containing magnetic powder is pressure compacted in a magnetic field while a liquid component is removed to form a green compact, and then the green compact is fired. A wet pressing method is advantageous because the magnetic powder is easily oriented by the magnetic field during compacting and the preferable magnetic properties of the sintered magnet can be obtained.

In the compacting method using CIM, the dried magnetic powder is heated and kneaded together with a binder resin to obtain pellets. The formed pellets are injection molded in a mold to which a magnetic field is applied. Thereby, a preliminary green compact is obtained. The preliminary green compact is subjected to a binder removal treatment and then fired.

Hereinafter, wet pressing will be described in detail.

(Wet Pressing and Firing)

When obtaining the ferrite sintered magnet by a wet pressing method, a slurry is obtained by carrying out the above fine pulverization step using a wet method. The slurry is concentrated to a predetermined concentration to obtain a slurry for wet pressing. Compacting may be performed using the slurry for wet pressing.

The slurry can be concentrated by a centrifugation, a filter press, and the like. A content of the finely pulverized material in the slurry for wet pressing may be 30 mass % to 80 mass % or so in a total amount of the slurry for wet pressing.

In the slurry, water can be used as a dispersion medium for dispersing the finely pulverized powder. In this case, a surfactant such as gluconic acid, gluconate, sorbitol, and the like may be added to the slurry. A non-aqueous solvent may be used as the dispersion medium. As the non-aqueous solvent, an organic solvent such as toluene, xylene, and the like can be used. In this case, a surfactant such as oleic acid and the like can be added.

A slurry for wet pressing may be prepared by adding a dispersion medium and the like to the finely pulverized material in a dry state after the fine pulverization.

Next, in wet pressing, the slurry for wet pressing is compacted in a magnetic field. A compacting pressure can be 9.8 MPa to 98 MPa (0.1 ton/$cm^2$ to 1.0 ton/$cm^2$) or so. A magnetic field applied can be 400 kA/m to 1600 kA/m or so. A direction of pressure applied and a direction of the magnetic field applied during compacting may be in the same direction or in orthogonal direction.

A green compact obtained by wet pressing can be fired in an oxidizing atmosphere such as in the air and the like. A firing temperature can be 1050° C. to 1270° C. A firing time (a length of time holding at the firing temperature) can be 0.5 hours to 3 hours or so. Then, the ferrite sintered magnet is obtained after firing.

When the green compact is obtained by wet pressing, before reaching to the firing temperature, the green compact can be heated from a room temperature to 100° C. or so at a temperature increasing rate of 2.5° C./minute or so. By sufficiently drying the green compact, cracks can be suppressed from forming.

Further, when a surfactant (dispersant) and the like is added, for example, heating may be carried out within a temperature range of 100° C. to 500° C. or so at a temperature increasing rate of 2.0° C./min or so. As a result, the surfactant and the like can be sufficiently removed (degreasing treatment). These treatments may be performed at the beginning of the firing step or separately before the firing step.

Hereinabove, a preferable method for producing the ferrite sintered magnet has been described, however the method is not limited to above, and production conditions may be modified appropriately.

A shape of the ferrite sintered magnet obtained by the present embodiment is not limited. For example, the ferrite sintered magnet may have various shapes such as an arc segment shape, a flat plate shape, a columnar shape, a cylindrical shape, and the like having anisotropy. According to the ferrite sintered magnet of the present embodiment, regardless of the magnet shape, a high Br can be obtained while maintaining a high HcJ.

Use of the ferrite sintered magnet obtained by the present embodiment is not particularly limited, and for example it can be used for a rotating electric machine. Also, the rotating electric machine obtained by the present embodiment includes the above ferrite sintered magnet. Note that, a type of the rotating electric machine is not particularly limited. For example, a motor, a generator, and the like may be mentioned.

Examples

Hereinafter, the present embodiment will be described in detail with reference to examples, however, the present invention is not limited thereto.

<Blending Step>

As starting raw materials, $SrCO_3$, $La_2O_3$, $Fe_2O_3$, $Co_3O_4$, $CaCO_3$, $SiO_2$, $BaCO_3$, $Al_2O_3$, and $Cr_2O_3$ were prepared. These raw materials were weighed so that a composition of the ferrite sintered magnet obtained at the end satisfied a composition of each sample shown in Tables 1 to 9.

Among the above starting raw materials, the raw materials other than $La_2O_3$ and $Co_3O_4$ were mixed and pulverized by a wet attritor, thereby a raw material mixture in a slurry form was obtained.

<Calcination Step>

After drying the raw material mixture, a calcining treatment was carried out maintaining at 1200° C. in the air for 2 hours to obtain a calcined body.

<Pulverization Step>

The obtained calcined body was coarsely pulverized by a rod mill, then a coarsely pulverized material was obtained. Next, $La_2O_3$ and $Co_3O_4$ were added and a fine pulverization was performed for 28 hours using a wet ball mill to obtain a slurry. The obtained slurry was adjusted to have a solid content concentration of 70 to 75 mass % to obtain a slurry for wet pressing.

<Compacting Step and Firing Step>

Next, a preliminary green compact was obtained by using a wet magnetic field pressing machine. A compacting pressure was 50 MPa and an applied magnetic field was 800 kA/m. A direction of pressure applied and a direction of the magnetic field applied during compacting were set to the same direction. The preliminary green compact obtained by wet pressing was a disk shape having a diameter of 30 mm and a height of 15 mm.

The preliminary green compact was fired in the air at an optimum firing temperature for 1 hour, and then a ferrite sintered magnet which was a sintered body was obtained.

Hereinafter, a method of determining the optimum firing temperature of the present examples is described.

First, for a composition of each experiment sample, firing was performed by varying the firing temperature in 10° C. increment from 1190 to 1230° C., thereby the sintered body was produced. That is, for each experiment sample, a total of five sintered bodies were produced. Then, a density of each sintered body was measured and a firing temperature of the sintered body with the highest density was defined as the optimum firing temperature. Note that, the density of the sintered body was measured by Archimedes method.

A fluorescent X-ray quantitative analysis was performed to each ferrite sintered magnet. It was confirmed that each ferrite sintered magnet had the composition shown in Tables 1 to 9.

Further, it was confirmed by an X-ray diffraction measurement that each of the ferrite sintered magnets shown in Tables 1 to 9 had a hexagonal M-type structure.

<Measurement of Magnetic Properties (Br, HcJ)>

In each experiment sample, upper and lower surfaces of each ferrite sintered magnet obtained by firing at the optimum firing temperature were processed. Then, the magnetic properties were measured in the air at 25° C. using a BH tracer with a maximum applied magnetic field of 1989 kA/m. Results are shown in Tables 1 to 9.

<Cost>

A column indicating "Cost" of the present experiment samples represents a content of Co (yz) which is an expensive raw material. When Co content (yz) was yz≤0.20, it was considered good. When Co content (yz) was yz>0.20, it was considered bad.

TABLE 1

| Sample No. | $Sr_{1-x}La_x(Fe_{12-y}Co_y)_zO_{19}$ (atomic ratio) | | | | Subcomponents (mass %) | | | | | Br (mT) | HcJ (kA/m) | Cost |
|---|---|---|---|---|---|---|---|---|---|---|---|---|
|  | 1 − x | x | (12 − y)z | yz | CaO(Mc) | $SiO_2$(Ms) | BaO(Mb) | $Al_2O_3$(Ma) | $Cr_2O_3$(Mr) | | | |
| Comparative example 1 | 0.90 | 0.10 | 11.86 | 0.15 | 0.57 | 0.45 | 0.12 | 0.05 | 0.05 | 415.2 | 389.0 | Good |
| Example 1 | 0.87 | 0.13 | 11.86 | 0.15 | 0.57 | 0.45 | 0.12 | 0.05 | 0.05 | 432.6 | 380.2 | Good |
| Example 2 | 0.86 | 0.14 | 11.86 | 0.15 | 0.57 | 0.45 | 0.12 | 0.05 | 0.05 | 437.2 | 374.4 | Good |
| Example 3 | 0.84 | 0.16 | 11.86 | 0.15 | 0.57 | 0.45 | 0.12 | 0.05 | 0.05 | 439.7 | 372.6 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 5 | 0.81 | 0.19 | 11.86 | 0.15 | 0.57 | 0.45 | 0.12 | 0.05 | 0.05 | 445.8 | 351.0 | Good |
| Example 6 | 0.77 | 0.23 | 11.86 | 0.15 | 0.57 | 0.45 | 0.12 | 0.05 | 0.05 | 445.3 | 345.0 | Good |
| Comparative example 2 | 0.76 | 0.24 | 11.86 | 0.15 | 0.57 | 0.45 | 0.12 | 0.05 | 0.05 | 446.0 | 329.0 | Good |

TABLE 2

| Sample No. | $Sr_{1-x}La_x(Fe_{12-y}Co_y)_zO_{19}$ (atomic ratio) | | | | Subcomponents (mass %) | | | | | Br (mT) | HcJ (kA/m) | Cost |
|---|---|---|---|---|---|---|---|---|---|---|---|---|
|  | 1 − x | x | (12 − y)z | yz | CaO(Mc) | $SiO_2$(Ms) | BaO(Mb) | $Al_2O_3$(Ma) | $Cr_2O_3$(Mr) | | | |
| Comparative example 3 | 0.82 | 0.18 | 10.60 | 0.14 | 0.57 | 0.45 | 0.12 | 0.05 | 0.05 | 422.7 | 316.4 | Good |
| Example 7 | 0.82 | 0.18 | 10.80 | 0.14 | 0.57 | 0.45 | 0.12 | 0.05 | 0.05 | 431.0 | 332.0 | Good |
| Example 8 | 0.82 | 0.18 | 11.10 | 0.14 | 0.57 | 0.45 | 0.12 | 0.05 | 0.05 | 439.1 | 334.0 | Good |
| Example 9 | 0.82 | 0.18 | 11.39 | 0.14 | 0.57 | 0.45 | 0.12 | 0.05 | 0.05 | 442.0 | 338.0 | Good |
| Example 10 | 0.82 | 0.18 | 11.60 | 0.14 | 0.57 | 0.45 | 0.12 | 0.05 | 0.05 | 443.5 | 347.4 | Good |
| Example 11 | 0.82 | 0.18 | 11.66 | 0.14 | 0.57 | 0.45 | 0.12 | 0.05 | 0.05 | 444.4 | 355.0 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 12 | 0.82 | 0.18 | 11.99 | 0.15 | 0.57 | 0.45 | 0.12 | 0.05 | 0.05 | 442.5 | 365.7 | Good |
| Example 13 | 0.82 | 0.18 | 12.10 | 0.15 | 0.57 | 0.45 | 0.12 | 0.05 | 0.05 | 440.0 | 378.0 | Good |

TABLE 2-continued

| Sample No. | $Sr_{1-x}La_x(Fe_{12-y}Co_y)_zO_{19}$ (atomic ratio) | | | | Subcomponents (mass %) | | | | | Br | HcJ | |
| --- | --- | --- | --- | --- | --- | --- | --- | --- | --- | --- | --- | --- |
| | 1 − x | x | (12 − y)z | yz | CaO(Mc) | SiO$_2$(Ms) | BaO(Mb) | Al$_2$O$_3$(Ma) | Cr$_2$O$_3$(Mr) | (mT) | (kA/m) | Cost |
| Comparative example 4 | 0.82 | 0.18 | 12.30 | 0.14 | 0.57 | 0.45 | 0.12 | 0.05 | 0.05 | 419.0 | 377.0 | Good |

TABLE 3

| Sample No. | $Sr_{1-x}La_x(Fe_{12-y}Co_y)_zO_{19}$ (atomic ratio) | | | | Subcomponents (mass %) | | | | | Br | HcJ | |
| --- | --- | --- | --- | --- | --- | --- | --- | --- | --- | --- | --- | --- |
| | 1 − x | x | (12 − y)z | yz | CaO(Mc) | SiO$_2$(Ms) | BaO(Mb) | Al$_2$O$_3$(Ma) | Cr$_2$O$_3$(Mr) | (mT) | (kA/m) | Cost |
| Comparative example 5 | 0.82 | 0.18 | 11.86 | 0.08 | 0.57 | 0.45 | 0.12 | 0.05 | 0.05 | 429.1 | 329.0 | Good |
| Example 14 | 0.82 | 0.18 | 11.86 | 0.13 | 0.57 | 0.45 | 0.12 | 0.05 | 0.05 | 435.9 | 345.3 | Good |
| Example 15 | 0.82 | 0.18 | 11.86 | 0.14 | 0.57 | 0.45 | 0.12 | 0.05 | 0.05 | 443.3 | 358.5 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 16 | 0.82 | 0.18 | 11.86 | 0.16 | 0.57 | 0.45 | 0.12 | 0.05 | 0.05 | 445.2 | 366.1 | Good |
| Example 17 | 0.82 | 0.18 | 11.86 | 0.18 | 0.57 | 0.45 | 0.12 | 0.05 | 0.05 | 440.0 | 370.0 | Good |
| Example 18 | 0.82 | 0.18 | 11.86 | 0.19 | 0.57 | 0.45 | 0.12 | 0.05 | 0.05 | 437.5 | 370.3 | Good |
| Example 19 | 0.82 | 0.18 | 11.86 | 0.20 | 0.57 | 0.45 | 0.12 | 0.05 | 0.05 | 434.0 | 371.0 | Good |
| Comparative example 6 | 0.82 | 0.18 | 11.86 | 0.22 | 0.57 | 0.45 | 0.12 | 0.05 | 0.05 | 419.0 | 365.0 | Bad |

TABLE 4

| Sample No. | $Sr_{1-x}La_x(Fe_{12-y}Co_y)_zO_{19}$ (atomic ratio) | | | | Subcomponents (mass %) | | | | | Br | HcJ | |
| --- | --- | --- | --- | --- | --- | --- | --- | --- | --- | --- | --- | --- |
| | 1 − x | x | (12 − y)z | yz | CaO(Mc) | SiO$_2$(Ms) | BaO(Mb) | Al$_2$O$_3$(Ma) | Cr$_2$O$_3$(Mr) | (mT) | (kA/m) | Cost |
| Example 20 | 0.82 | 0.18 | 11.86 | 0.15 | 0.33 | 0.45 | 0.12 | 0.05 | 0.05 | 435.0 | 380.9 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 21 | 0.82 | 0.18 | 11.86 | 0.15 | 0.60 | 0.45 | 0.12 | 0.05 | 0.05 | 446.2 | 363.0 | Good |
| Example 22 | 0.82 | 0.18 | 11.86 | 0.15 | 0.72 | 0.45 | 0.12 | 0.05 | 0.05 | 446.2 | 362.6 | Good |
| Example 23 | 0.82 | 0.18 | 11.86 | 0.15 | 0.76 | 0.45 | 0.12 | 0.05 | 0.05 | 445.7 | 367.3 | Good |
| Example 24 | 0.82 | 0.18 | 11.86 | 0.15 | 0.78 | 0.45 | 0.12 | 0.05 | 0.05 | 449.0 | 350.8 | Good |
| Example 25 | 0.82 | 0.18 | 11.86 | 0.15 | 0.85 | 0.45 | 0.12 | 0.05 | 0.05 | 450.0 | 346.0 | Good |

TABLE 5

| Sample No. | $Sr_{1-x}La_x(Fe_{12-y}Co_y)_zO_{19}$ (atomic ratio) | | | | Subcomponents (mass %) | | | | | Br | HcJ | |
| --- | --- | --- | --- | --- | --- | --- | --- | --- | --- | --- | --- | --- |
| | 1 − x | x | (12 − y)z | yz | CaO(Mc) | SiO$_2$(Ms) | BaO(Mb) | Al$_2$O$_3$(Ma) | Cr$_2$O$_3$(Mr) | (mT) | (kA/m) | Cost |
| Example 26 | 0.82 | 0.18 | 11.86 | 0.15 | 0.57 | 0.35 | 0.12 | 0.05 | 0.05 | 446.0 | 350.2 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 27 | 0.82 | 0.18 | 11.86 | 0.15 | 0.57 | 0.50 | 0.12 | 0.05 | 0.05 | 440.0 | 375.2 | Good |
| Example 28 | 0.82 | 0.18 | 11.86 | 0.15 | 0.57 | 0.55 | 0.12 | 0.05 | 0.05 | 437.5 | 377.2 | Good |
| Example 29 | 0.82 | 0.18 | 11.86 | 0.15 | 0.57 | 0.60 | 0.12 | 0.05 | 0.05 | 435.7 | 378.3 | Good |

TABLE 6

| Sample No. | $Sr_{1-x}La_x(Fe_{12-y}Co_y)_zO_{19}$ (atomic ratio) | | | | Subcomponents (mass %) | | | | | Br | HcJ | |
| --- | --- | --- | --- | --- | --- | --- | --- | --- | --- | --- | --- | --- |
| | 1 − x | x | (12 − y)z | yz | CaO(Mc) | SiO$_2$(Ms) | BaO(Mb) | Al$_2$O$_3$(Ma) | Cr$_2$O$_3$(Mr) | (mT) | (kA/m) | Cost |
| Example 30 | 0.82 | 0.18 | 11.86 | 0.15 | 0.57 | 0.45 | 0.03 | 0.05 | 0.05 | 446.1 | 364.5 | Good |
| Example 31 | 0.82 | 0.18 | 11.86 | 0.15 | 0.57 | 0.45 | 0.05 | 0.05 | 0.05 | 444.1 | 367.4 | Good |
| Example 32 | 0.82 | 0.18 | 11.86 | 0.15 | 0.57 | 0.45 | 0.08 | 0.05 | 0.05 | 445.2 | 368.6 | Good |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 33 | 0.82 | 0.18 | 11.86 | 0.15 | 0.57 | 0.45 | 0.15 | 0.05 | 0.05 | 435.8 | 362.9 | Good |

TABLE 7

| Sample No. | $Sr_{1-x}La_x(Fe_{12-y}Co_y)_zO_{19}$ (atomic ratio) | | | | Subcomponents (mass %) | | | | | Br (mT) | HcJ (kA/m) | Cost |
|---|---|---|---|---|---|---|---|---|---|---|---|---|
| | 1 − x | x | (12 − y)z | yz | CaO(Mc) | SiO₂(Ms) | BaO(Mb) | Al₂O₃(Ma) | Cr₂O₃(Mr) | | | |
| Example 4a | 0.82 | 0.18 | 11.86 | 0.15 | 0.57 | 0.45 | 0.12 | 0.05 | 0.05 | 446.9 | 361.1 | Good |
| Example 4 | 0.82 | 0.18 | 11.86 | 0.15 | 0.57 | 0.46 | 0.12 | 0.05 | 0.08 | 446.2 | 362.6 | Good |
| Example 34 | 0.82 | 0.18 | 11.86 | 0.15 | 0.57 | 0.45 | 0.12 | 0.10 | 0.05 | 445.1 | 374.9 | Good |
| Example 35 | 0.82 | 0.18 | 11.86 | 0.15 | 0.57 | 0.45 | 0.12 | 0.40 | 0.05 | 443.4 | 377.1 | Good |
| Example 36 | 0.82 | 0.18 | 11.86 | 0.15 | 0.57 | 0.45 | 0.12 | 0.70 | 0.05 | 442.4 | 377.9 | Good |
| Example 37 | 0.82 | 0.18 | 11.86 | 0.15 | 0.57 | 0.45 | 0.12 | 0.90 | 0.05 | 436.0 | 380.0 | Good |

TABLE 8

| Sample No. | $Sr_{1-x}La_x(Fe_{12-y}Co_y)_zO_{19}$ (atomic ratio) | | | | Subcomponents (mass %) | | | | | Br (mT) | HcJ (kA/m) | Cost |
|---|---|---|---|---|---|---|---|---|---|---|---|---|
| | 1 − x | x | (12 − y)z | yz | CaO(Mc) | SiO₂(Ms) | BaO(Mb) | Al₂O₃(Ma) | Cr₂O₃(Mr) | | | |
| Example 4a | 0.82 | 0.18 | 11.86 | 0.15 | 0.57 | 0.46 | 0.12 | 0.05 | 0.05 | 446.9 | 361.1 | Good |
| Example 38 | 0.82 | 0.18 | 11.86 | 0.15 | 0.57 | 0.46 | 0.12 | 0.05 | 0.06 | 447.0 | 360.0 | Good |
| Example 4 | 0.82 | 0.18 | 11.86 | 0.15 | 0.57 | 0.46 | 0.12 | 0.05 | 0.08 | 446.2 | 362.6 | Good |
| Example 39 | 0.82 | 0.18 | 11.86 | 0.15 | 0.57 | 0.45 | 0.12 | 0.05 | 0.09 | 440.1 | 370.5 | Good |
| Example 40 | 0.82 | 0.18 | 11.86 | 0.15 | 0.57 | 0.45 | 0.12 | 0.05 | 0.10 | 436.0 | 371.0 | Good |

TABLE 9

| Sample No. | $Sr_{1-x}La_x(Fe_{12-y}Co_y)_zO_{19}$ (atomic ratio) | | | | Subcomponents (mass %) | | | | | Br (mT) | HcJ (kA/m) | Cost |
|---|---|---|---|---|---|---|---|---|---|---|---|---|
| | 1 − x | x | (12 − y)z | yz | CaO(Mc) | SiO₂(Ms) | BaO(Mb) | Al₂O₃(Ma) | Cr₂O₃(Mr) | | | |
| Example 19 | 0.82 | 0.18 | 11.86 | 0.20 | 0.57 | 0.45 | 0.12 | 0.05 | 0.05 | 434.0 | 371.0 | Good |
| Example 41 | 0.80 | 0.20 | 12.10 | 0.20 | 0.76 | 0.52 | 0.11 | 0.07 | 0.14 | 441.1 | 334.1 | Good |
| Comparative example 14 | 0.80 | 0.20 | 12.13 | 0.20 | 0.76 | 0.52 | 0.11 | 0.07 | 0.14 | 440.0 | 318.3 | Good |
| Comparative example 15 | 0.80 | 0.20 | 12.27 | 0.20 | 0.76 | 0.51 | 0.11 | 0.06 | 0.17 | 440.0 | 318.3 | Good |

According to Tables 1 to 9, Examples in which x, (12−y)z, and yz were all within the predetermined ranges had good Br and HcJ, and the cost was good. Specifically, all Examples had Br of larger than 420 mT; and Examples 2 to 6, 8 to 18, 20 to 40, and 41 had Br of larger than 435 mT. Also, all Examples had HcJ of larger than 330.0 kA/m; and Examples 2 to 6, and 10 to 40 had HcJ of larger than 345 kA/m. On the contrary to this, when any one of x, (12−y)z, and yz were out of the predetermined ranges, Br, HcJ, and/or cost deteriorated.

Results indicate that when CaO, SiO₂, BaO, Al₂O₃, and/or Cr₂O₃ were included within the preferable ranges, the magnetic properties tended to improve easily.

What is claimed is:

1. A ferrite sintered magnet comprising a hexagonal M-type ferrite including A, R, Fe, and Co in an atomic ratio of $A_{1-x}R_x(Fe_{12-y}Co_y)_zO_{19}$, wherein
   A is at least one selected from Sr, Ba, and Pb,
   R is La only or La and at least one selected from rare earth elements, and $0.13 \leq x \leq 0.23$, $10.80 \leq (12-y)z \leq 12.10$, and $0.13 < yz < 0.20$ are satisfied, $0.05 \leq Ma \leq 0.70$ is satisfied in which Ma is Al₂O₃ content (mass %) converted from a content of Al included in the ferrite sintered magnet, and $0.30 < Mc < 0.85$ is satisfied in which Mc is CaO content (mass %) converted from a content of Ca included in the ferrite sintered magnet.

2. The ferrite sintered magnet according to claim 1, wherein $0.35 \leq Ms \leq 0.60$ is satisfied in which Ms is SiO₂ content (mass %) converted from a content of Si included in the ferrite sintered magnet.

3. The ferrite sintered magnet according to claim 1, wherein $0 \leq Mb \leq 0.15$ is satisfied in which Mb is BaO content (mass %) converted from a content of Ba included in the ferrite sintered magnet.

4. The ferrite sintered magnet according to claim 1, wherein $0.03 \leq Mb \leq 0.15$ is satisfied in which Mb is BaO content (mass %) converted from a content of Ba included in the ferrite sintered magnet.

5. The ferrite sintered magnet according to claim 1, wherein $0 \leq Mr \leq 0.10$ is satisfied in which Mr is Cr₂O₃ content (mass %) converted from a content of Cr included in the ferrite sintered magnet.

6. The ferrite sintered magnet according to claim 1, wherein $0.05 \leq Mr \leq 0.09$ is satisfied in which Mr is Cr₂O₃ content (mass %) converted from a content of Cr included in the ferrite sintered magnet.

7. A rotating electric machine including the ferrite sintered magnet according to claim 1.

* * * * *